US005285426A

United States Patent [19]
Teodoridis

[11] Patent Number: 5,285,426
[45] Date of Patent: Feb. 8, 1994

[54] ROLLERBALL CONTROL ARRANGEMENT FOR A TIMEPIECE ADAPTED TO RECEIVE RADIO BROADCAST MESSAGES

[75] Inventor: Viron Teodoridis, Hauterive, Switzerland

[73] Assignee: ETA SA Fabriques d'Ebauches, Grenchen, Switzerland

[21] Appl. No.: 100,240

[22] Filed: Aug. 2, 1993

[30] Foreign Application Priority Data

Aug. 3, 1992 [CH] Switzerland ........................ 02431/92

[51] Int. Cl.5 ........................ G04B 47/00; G04C 17/00; H04B 7/00

[52] U.S. Cl. ........................................ 368/10; 368/70; 340/825.44

[58] Field of Search ........................ 368/10, 11, 69-70, 368/319-320; 340/825.44, 825.47, 825.48

[56] References Cited

U.S. PATENT DOCUMENTS

| | | |
|---|---|---|
| 4,398,831 | 8/1983 | Fatton et al. . |
| 4,620,797 | 11/1986 | Besson et al. . |
| 4,713,808 | 12/1987 | Gaskill et al. . |
| 4,884,252 | 11/1989 | Teodoridis et al. . |
| 4,897,835 | 1/1990 | Gaskill et al. . |
| 5,065,423 | 11/1991 | Gaskill . |
| 5,088,070 | 2/1992 | Shiff ....................................... 368/10 |
| 5,150,954 | 9/1992 | Hoff . |
| 5,159,713 | 10/1992 | Gaskill et al. . |
| 5,168,271 | 12/1992 | Hoff . |
| 5,187,470 | 2/1993 | King et al. . |
| 5,189,411 | 2/1993 | Collar et al. . |
| 5,189,413 | 2/1993 | Gaskill et al. . |

FOREIGN PATENT DOCUMENTS

| | | |
|---|---|---|
| 0408086 | 1/1991 | European Pat. Off. . |
| 0460525 | 12/1991 | European Pat. Off. . |
| 0460526 | 12/1991 | European Pat. Off. . |
| WO91/16771 | 10/1991 | PCT Int'l Appl. . |
| 2154306 | 9/1985 | United Kingdom . |
| 2219422 | 12/1989 | United Kingdom . |

*Primary Examiner*—Vit W. Miska
*Attorney, Agent, or Firm*—Pollock, Vande Sande & Priddy

[57] ABSTRACT

A timepiece includes a timekeeper displaying the hour (4) and the minute (5), a receiver for radio broadcast messages adapted to be read on a display (7) and a control arrangement (2) including a rollerball (1) adapted to be manually rolled in a first direction (Y) for which received messages can be displayed one after the other and in a second direction (X) for which at least the functions of engagement, of disengagement or entry into a special operating mode may be chosen. The rollerball may also be pressed in a third direction (Z) for which the displayed message may at least be erased or protected.

12 Claims, 14 Drawing Sheets

ROLLERBALL CONTROL ARRANGEMENT FOR A TIMEPIECE ADAPTED TO RECEIVE RADIO BROADCAST MESSAGES

The present invention concerns a timepiece including a timekeeper for displaying at least the hour and the minute by means of hands, a receiver for radio-broadcast messages composed of signs, a memory for storing said messages, a cell for displaying at least said messages, an acoustic transducer and a control arrangement.

BACKGROUND OF THE INVENTION

A timepiece responding to the generic definition hereinabove and in which the control arrangement includes a stem fitted with a manually operated crown has already been described in several documents published in the name of the same assignee. The general arrangement of the antenna confined within the watchcase forms the object of patent document EP-B-0 339 482 (U.S. Pat. No. 4,884,252). The combination of the movement, the caseband and the back cover of such a timepiece is described in patent document EPA-0 460 526. Finally, the arrangement of the cell energizing the radio frequency portion of the watch is set forth in patent document EP-A-0 460 525.

As such appears from what has been said hereinabove, the timepiece in question is backed by a search apparatus for persons, which will be designated hereinafter by its common name "pager". As will be seen further on, the pager portion is made up of an antenna, a receiver circuit, a decoder, a microcomputer and a memory capable of storing several messages, each of such messages upon request being able to appear on an LCD display cell. The pager is completed by an acoustic diffuser signalling for example the arrival of a message. The pager appears basically here as a microreceiver signalling to the user that a third person is looking for him.

There exist pagers transmitting only one or several acoustic signals. When the signal sounds, the user must then compose a suitable number on a telephone apparatus. The pager which will be the topic of discussion in the present description enables making the user aware at the same time as an acoustic signal can sound as to who is the third person seeking him and this through the appearance of a message on a display cell, such message consisting in most cases of the display of a telephone number to call back. In order to send his message, the third person begins by composing on his telephone apparatus the number of the pager to be attained following which a special acoustic signal sounds in the handset. The person then composes his message by means of the digital keyboard available on his own apparatus and awaits until the telephone exchange informs him that his call has been recorded. As soon as such confirmation is received, the handset can be rung off. After a subsequent lapse of time, the message sent will appear on the pager called, accompanied by a warning signal if the user so wishes.

To combine a pager with a wristwatch is advantageous because the apparatus is worn permanently by the user who, because of this, will not forget to take it with him and also because it is of a size greatly reduced from that exhibited by independent pagers known to the state of the art. Such combination, however, poses technical problems which are difficult to resolve. Certain of such problems have already formed the objective of descriptions in the documents cited hereinabove. The present invention aims to solve a problem which has not been raised up to the present and which is that posed by the control arrangement of an apparatus combining at the same time a wristwatch and a pager in which it is a matter on the one hand to be able to correct the time displayed by the watch and on the other hand to be able to run past the messages received by the pager or, if necessary, to be able to protect or erase such messages.

SUMMARY OF THE INVENTION

Such functions are assured according to the present invention by at least a rollerball emerging partially from the caseband with which the timepiece is provided, said rollerball being adapted to be manually rolled in a first direction thanks to which at least the messages contained in the memory can be displayed one after the other, and in a second direction, substantially perpendicular to the first, thanks to which at least functions of turn-on, turn-off or entry into a special operating mode of the receiver can be chosen, said rollerball furthermore being adapted to be manually pressed against the return force of a spring in a third direction, perpendicular to the other two, thanks to which at least the displayed message can be erased or protected.

The invention will now be explained by means of examples illustrated by the drawings.

DESCRIPTION OF THE PREFERRED EMBODIMENTS

Figure 1:
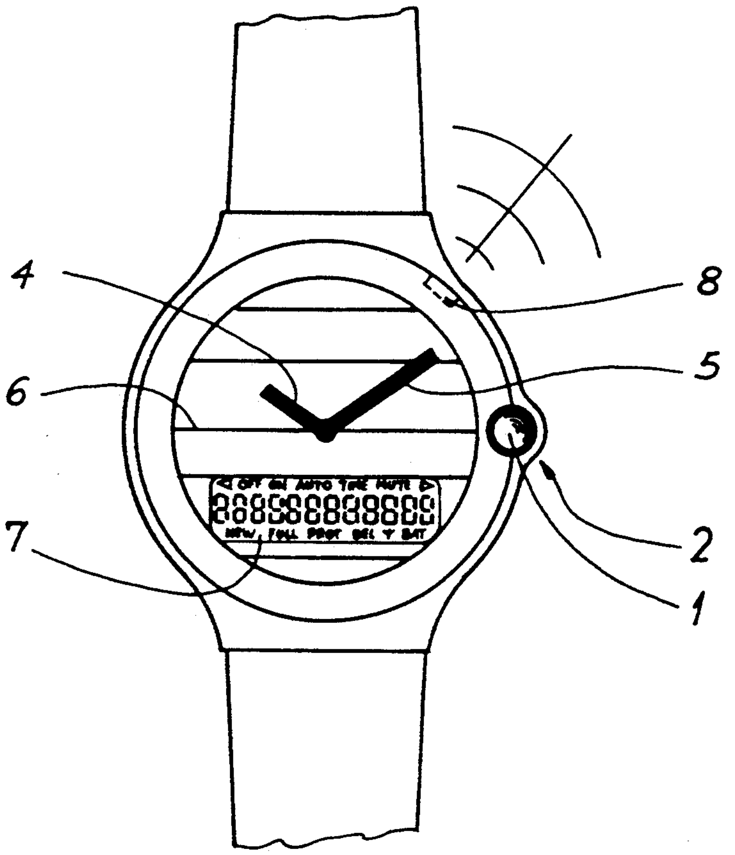
FIG. 1 is a plan view of a first embodiment of the pager watch according to the invention, in which the control arrangement includes only a single rollerball.
Figure 7:
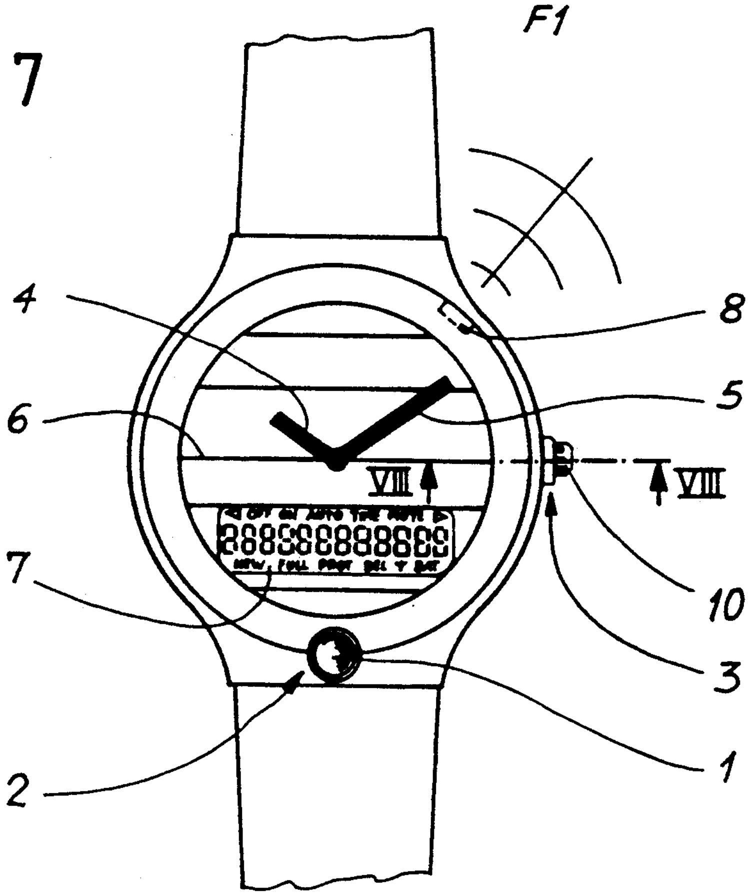
FIG. 7 is a plan view of a second embodiment of the pager watch according to the invention in which the control arrangement includes a stem - crown in addition to the rollerball.

FIGS. 1 and 7 are plan views of first and second embodiments of the pager watch according to the invention. This timepiece includes a timekeeper which displays the time of day at least by means of hours and minutes hands 4 and 5. The timepiece further includes a pager system, i.e. an arrangement comprising a receiver for radio-broadcast messages made up of signs and a memory for storing such messages, such receiver and memory forming the object of a description which will be found further on. The messages are captured by an antenna wound around the caseband of the case and which appears on FIGS. 1 and 7 under the form of wires 6. A description of this antenna may be read in the patent document EP-B-0 339 482 (U.S. Pat. No. 4,884,252). The messages appear on a cell 7 formed for example by a liquid crystal. Cell 7 is shown on FIG. 2 which is an enlarged view of said cell. The two embodiments of the pager watch further include a control arrangement 2 comprising in both cases a rollerball 1 adapted to be manually operated and the description of which is to follow. An acoustic diffuser 8 of which only the orifice has been shown on FIGS. 1 and 7 enables signalling, inter alia, the arrival of a message. The constructional organization of the entire arrangement is described in the patent document EP-A-0 460 526 to which one will be able to refer in order to obtain further details.

Figure 3:
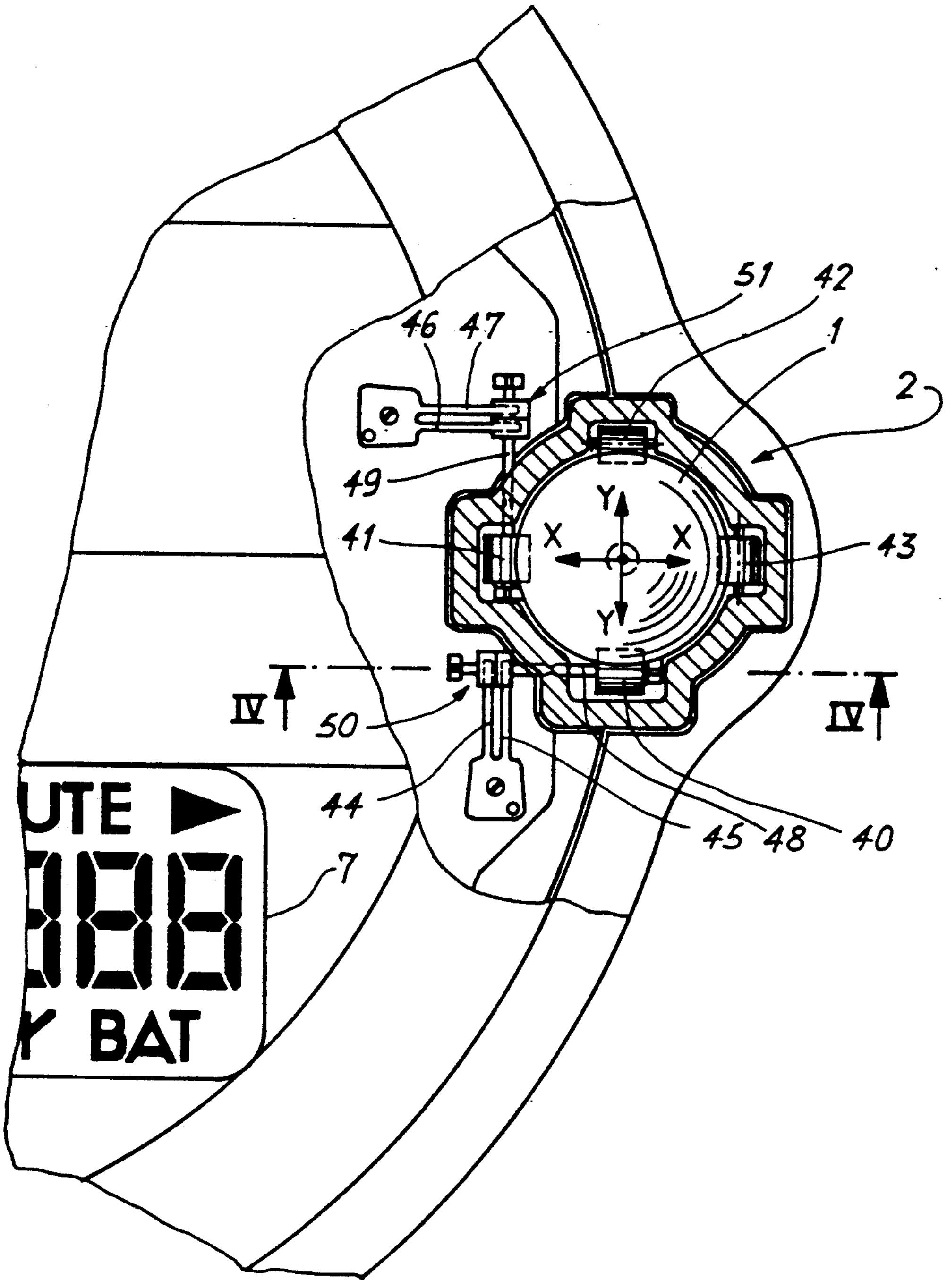
FIG. 3 is an enlarged broken-away view of the control arrangement shown summarily on FIG. 1.
Figure 4:
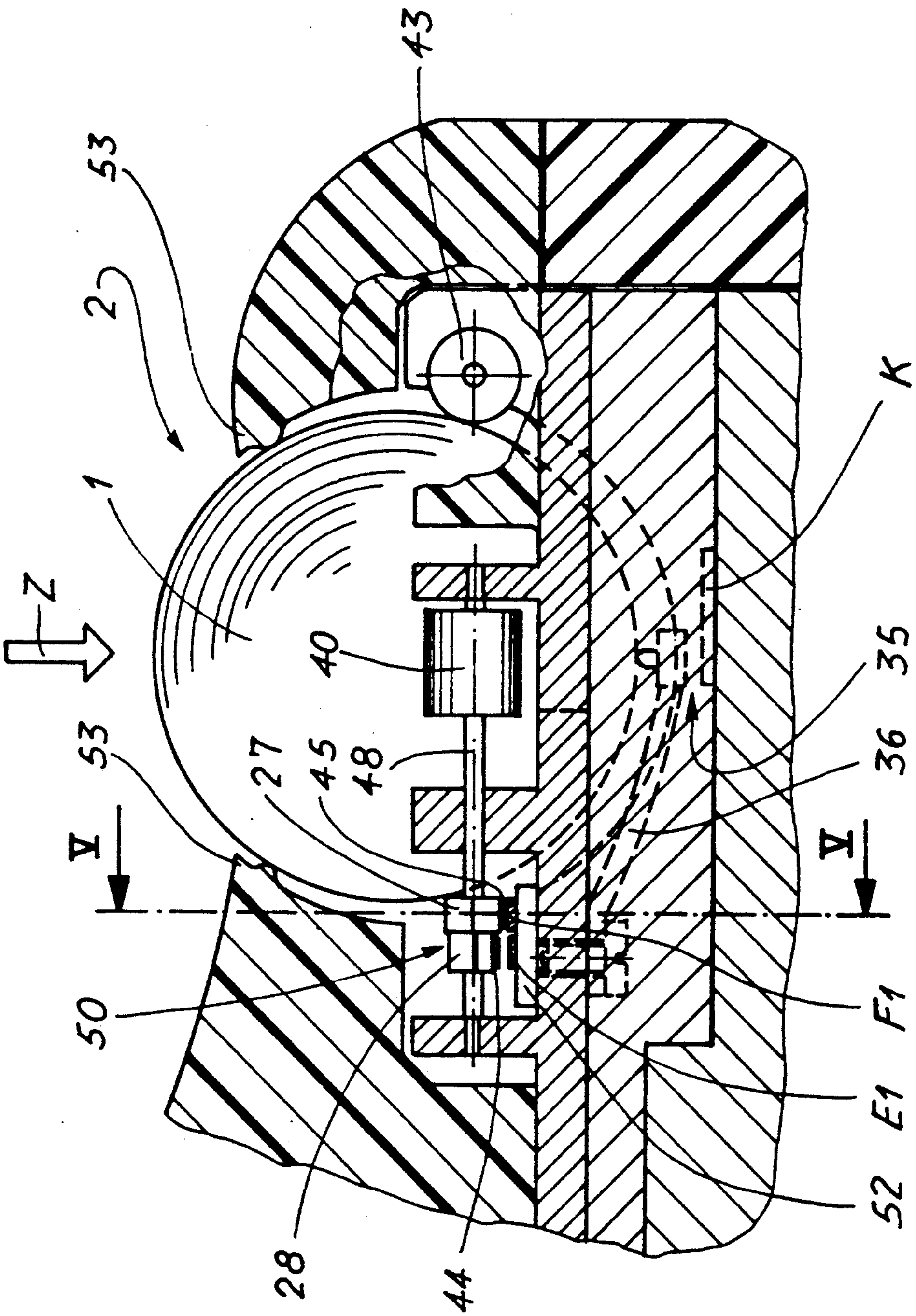
FIG. 4 is a cross-section according to line IV—IV of FIG. 3.

In both embodiments and according to the invention, the rollerball can be manoeuvred in three different directions according to a mechanism which is to be explained now with the help of FIGS. 3 and 4. As is seen on FIG. 3, rollerball 1 may be rolled manually in a first direction Y thanks to which messages contained in the memory can at least be displayed one after the other. Rollerball 1 can also be rolled in a second direction X which is substantially perpendicular to the first direction Y. The manipulation in direction X enables choosing at least functions of turn-on, turn off or entry into a special operational mode of the pager receiver. Finally, rollerball 1, as is seen on FIG. 4, can be pressed in a third direction Z perpendicular to the first two directions X and Y and against the return force of a spring, thanks to which the displayed message can at least be erased or protected.

FIG. 3 is an enlarged and broken-away view of the control arrangement 2 summarily shown on FIG. 1. Such arrangement includes a rollerball 1 which rests on four rollers 40, 41, 42 and 43. Rollers 40 and 41 are driven by rollerball 1 when the rollerball is rolled in directions Y and X respectively. As is better seen on FIG. 4, roller 40 drives alternately first 44 and second 45 conductive blades which respectively enter into contact with first E1 and second F1 conductive tracks when the rollerball is rolled in the first direction Y. It is the same for roller 41 (not shown on FIG. 4) which alternately drives third 46 and fourth 47 conductive blades which enter respectively into contact with third E2 and fourth F2 conductive tracks (not shown on FIG. 4) when the rollerball is rolled in the second direction X. Each roller 40 and 41 is fitted on a respective shaft 48 and 49. On shaft 48 is fitted a two-stage cam 50 and on shaft 49 a cam 51 likewise having two stages.

Figure 5:
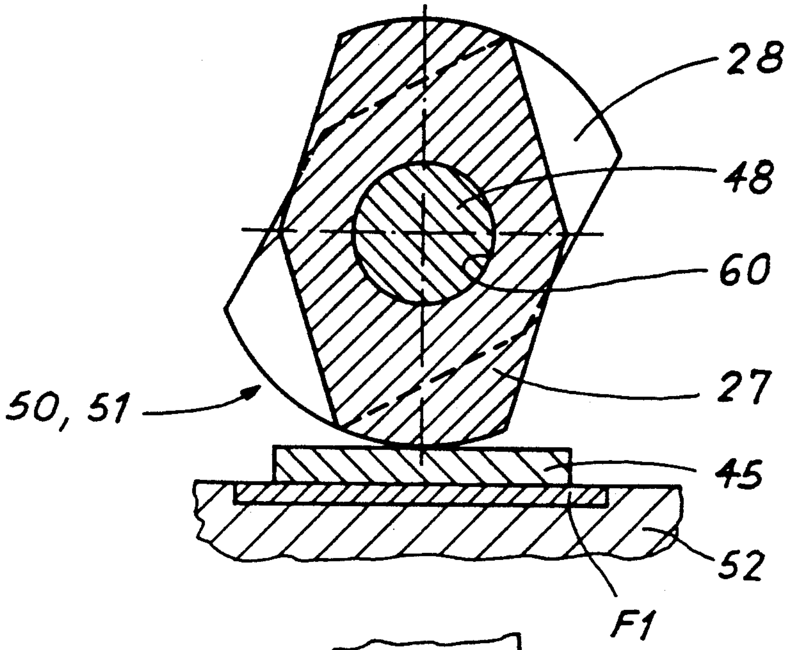
FIG. 5 is a cross-section according to line V—V of FIG. 4, such cross-section showing a two-stage cam forming part of the control mechanism.

Cam 50 which is similar to cam 51 is shown on FIG. 5 which is a cross-section along line V—V of FIG. 4. Cam 50 includes two stages 27 and 28 and a hole 60 intended to receive shaft 48 connecting roller 40 to cam 50. Each of the stages possesses an oblong section as is readily seen on FIG. 5 on the hatched portion of stage 27. Stages 27 and 28 are angularly shifted relative to one another by about 45°. As is seen on FIG. 4, elastic conductive blades 44 and 45 bear respectively on stages 28 and 27 of cam 50 in a manner such that when the cam is driven in rotation by roller 40 which itself is driven by the rollerball 1, blades 44 and 45 enter alternately into contact with the conductive tracks respectively designated by E1 and F1, such tracks being engraved on a printed circuit 52. Cam 51 in the same manner drives elastic blades 46 and 47 which enter alternately into contact with conductive tracks E2 and F2 respectively.

Rollers 42 and 43 shown on FIG. 3 are also driven by the rollerball but have no other effect than that of exhibiting a lifting function for the rollerball. A spring arrangement (not shown but which is described for example in patent document GB-A-2 154 306) acts on the lifting rollers as return spring in a manner such that rollerball 1 is supported at rest or when it is rolled in directions X and Y within orifice 53 from which it partially emerges (see FIG. 4).

The lifting and elastic effect of rollers 42 and 43 having been explained, it will be understood that in exerting a pressure on rollerball 1 according to the sense of arrow Z shown on FIG. 4, a switch 35 formed by an elastic and conductive blade 36 and a conductive track K is closed, which can form part of a printed circuit, not shown.

There will now be described the two embodiments of the invention.

1. First Embodiment

FIG. 1 is a plan view of the first embodiment of the invention. In this embodiment, the control arrangement 2 of the pager watch is a single rollerball 1 arranged at 3 o'clock. Such rollerball emerges from the caseband and may be operated by a finger of the hand along the three different directions set forth hereinabove. Such rollerball could be arranged elsewhere than 3 o'clock, at 6 o'clock for example.

Figure 2:
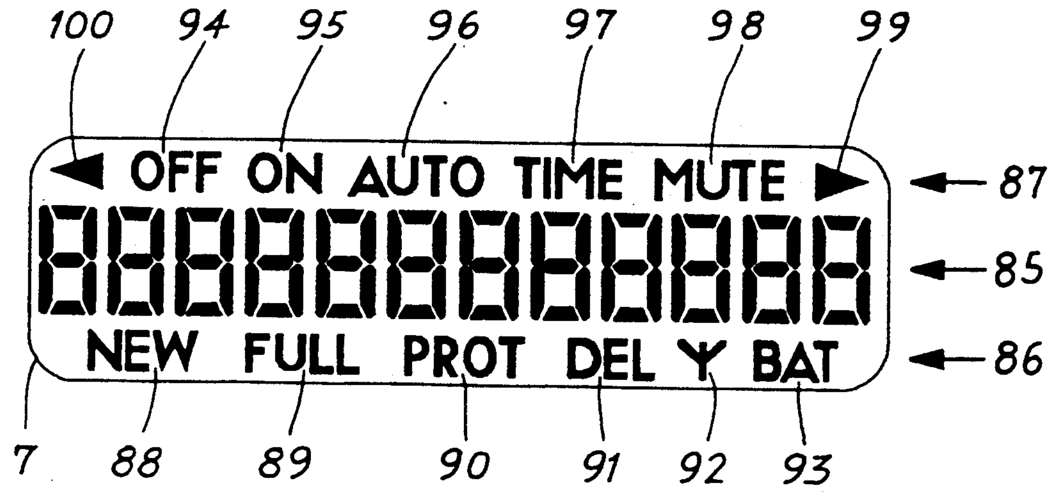
FIG. 2 is an enlarged illustration of the display cell of the watch of FIG. 1 showing the various graphic representations capable of being displayed thereon.

FIG. 2 is an enlarged showing of the display cell referenced 7 on FIG. 1. Such cell includes a zone 85 referred to as the message zone and two zones 86 and 87 referred to as indicators. In zone 85 appear messages which can be made up of digits and letters. Each sign includes a set of segments, here seven segments at the maximum. In the display taken as example, the message can contain at maximum twelve signs. In the indicator zone 86, there is found: at 88, the indication NEW which signals a new message and remains displayed as long as the latter has not been acknowledged by a short pressure on the rollerball; at 89, the indication FULL which indicates that the memory is full; at 90, the indication PROT signalling the operation of protecting the message; at 91, the indication DEL signalling the erase function; at 92, the sign Y indicating that the radio range is good, thus that message reception is possible; at 93, the indication BAT indicating that the power cell of the pager must be changed. In the indicator zone 87, there is found: at 100, a sign indicating that there has been overflow of the message to the left of the cell; at 94, the indication OFF indicating that the pager is turned off; at 95, the indication ON signalling that the pager is turned on; at 96, the indication AUTO signalling that the pager is turned on and turned off automatically; at 97, the indication TIME permitting setting of the internal clock of the pager; at 98, the indication MUTE signalling that the pager is in a standby state; at 99, a sign indicating that there is overflow of the message to the right of the display cell.

Figure 6:
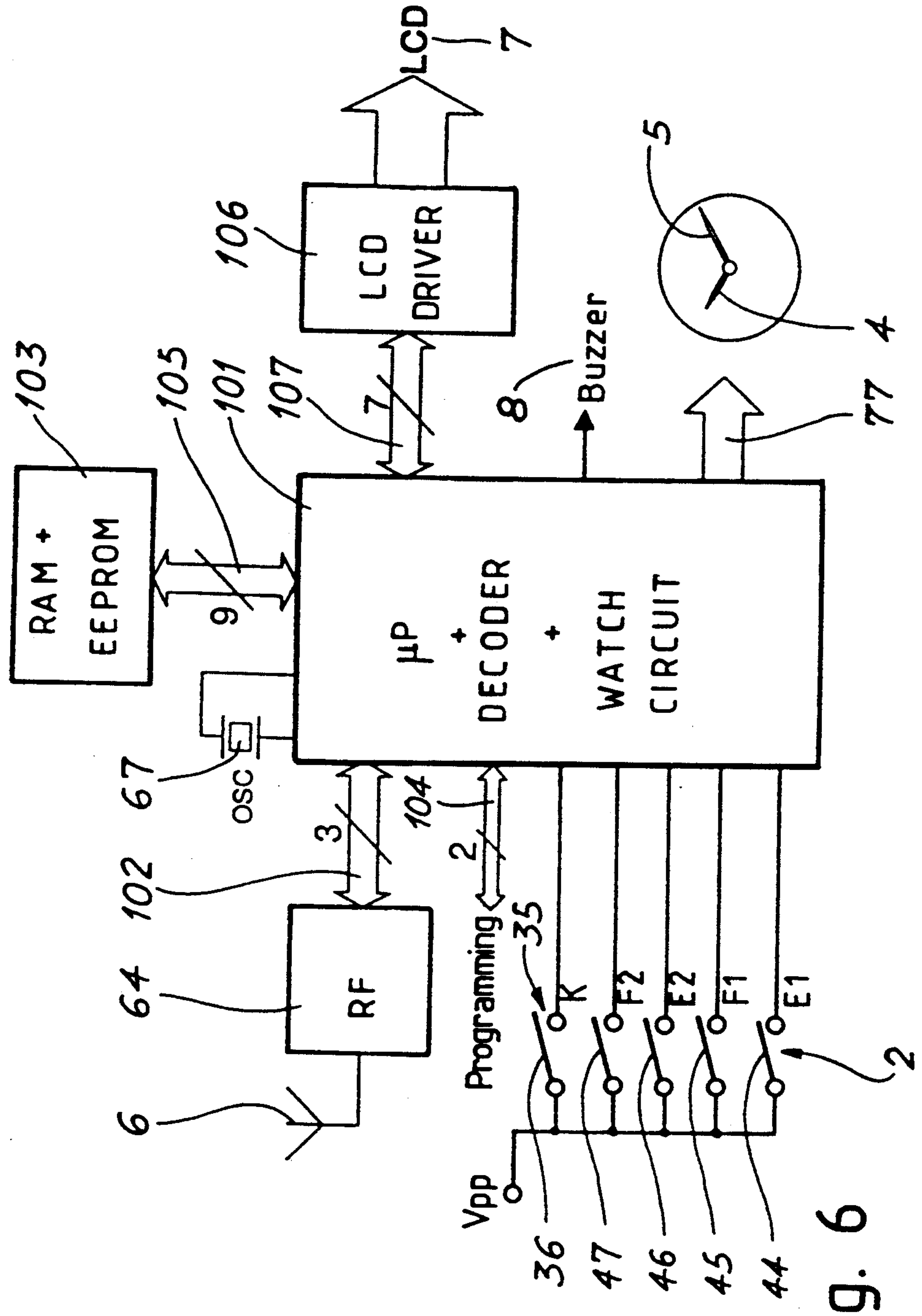
FIG. 6 is a block schematic showing the electronic part of the pager watch of FIG. 1.

FIG. 6 is a block schematic showing the electronic part of the pager watch illustrated on FIG. 1. Messages captured by the antenna 6 are received by an RF circuit 64 (for example of the type UAA 2033 of the Philips Company) which is coupled to a special circuit 101 by a three wire bus 102. The special circuit 101 allies an ordinary microcomputer with a decoder in order to decode the messages present at the output of RF circuit 64 (for example of the type PCF 5001 of the Philips Company). Such special circuit further includes a watch circuit (for example of the type H 5026 of the EM Microelectronic - Marin Company) including a clock oscillator 67, a frequency divider and a driver attacking, by line 77, a stepping motor having two rotation senses, the rotor spindle of such motor driving a wheel train and hours and minutes hands 4 and 5. The decoder is associated with an exterior EEPROM memory 103 which can be programmed by the two line conductor 104 referred to as the programming line, in order to report only messages intended for this specific pager possessing its own radio identification code (RIC) and responding on the occasion to the radioelectric calling code Nr 1 of the CCIR (based on the recommendation CCIR 584-1, Dubrovnik, 1986). The special circuit 101 is coupled by a nine wire bus 105 to the memory EEPROM already mentioned, such memory being associated with another memory RAM. The messages to be made to appear on the liquid crystal display LCD 7 are controlled by a driver 106 itself coupled to circuit 101 by a seven wire bus 107. To the special circuit 101 is coupled an acoustic alarm or buzzer 8. To circuit 101 are connected the conductive tracks E1 and F1 to which correspond respectively conductive blades 44 and 45 (rolling the rollerball in direction Y), conductive tracks E2 and F2 to which correspond respectively conductive blades 46 and 47 (rolling the rollerball in direction X) and the track K to which corresponds blade 36 (pressing the roller ball in direction Z), such tracks and blades having been described hereinabove and discussed with reference to FIGS. 3 and 4. Blades 44, 45, 46, 47 and 36 are all connected to a common potential $V_{pp}$. The fact that the rollerball is rolled in direction Y, for example, has as result that tracks E1 and F1 are coupled alternately to potential $V_{pp}$. Such alternation is taken into account by circuit 101 which is then capable of recognizing initially the fact that the rollerball is driven in rotation and next in which sense such rotation takes place.

Memory RAM 103 of FIG. 6 is of standard construction. In such memory RAM messages are stacked one over another, the oldest at the bottom and the most recent at the top of the stack and a zone without message surmounts the most recent message, such zone exhibiting a neutral display when it is shown (see FIG. 12). Memory RAM being able to contain only a limited number of messages, it is evident that if said memory is full, a newly entering message is going to bring about loss of the oldest message if such latter is not protected.

With the help of FIGS. 11 to 16, there will be described now the manner of making use of the pager watch in acting on the sole roller ball 1. The symbols used on the figures under discussion with their significance are as follows:

| | |
|---|---|
| << : | long duration pressure on the rollerball |
| < : | short duration pressure on the rollerball |
| : | rolling of the rollerball in direction X |
| → : | rolling in the direction X and in the sense 9 o'clock-3 o'clock |
| ← : | rolling in the direction X and in the sense 3 o'clock-9 o'clock |
| : | rolling of the rollerball in direction Y |
| ↑ : | rolling in the direction Y and in the sense 6 o'clock-12 o'clock |
| ↓ : | rolling in the direction Y and in the sense 12 o'clock-6 o'clock |

A pressure on the rollerball is long (<<) when its duration exceeds one second. Such pressure is short (<) when such duration is less than one second. Short and long pressures can be acknowledged by an acoustic bip.

It is evident that the rollerball can be rolled in other directions than the strict directions X and Y. In such case a discriminator mounted in the electronic circuit will decide which of the two directions must be taken into consideration, the preponderance being given to the cam 50, 51 which rotates most rapidly.

Generally, rolling of rollerball in the direction X enables selecting a function while a short duration pressure enables validating the chosen function and a long duration pressure permits entering into a phase or special menu. Generally as well, rolling the rollerball in direction Y enables passing from one message to another and permits reaching the neutral display.

Figure 11:
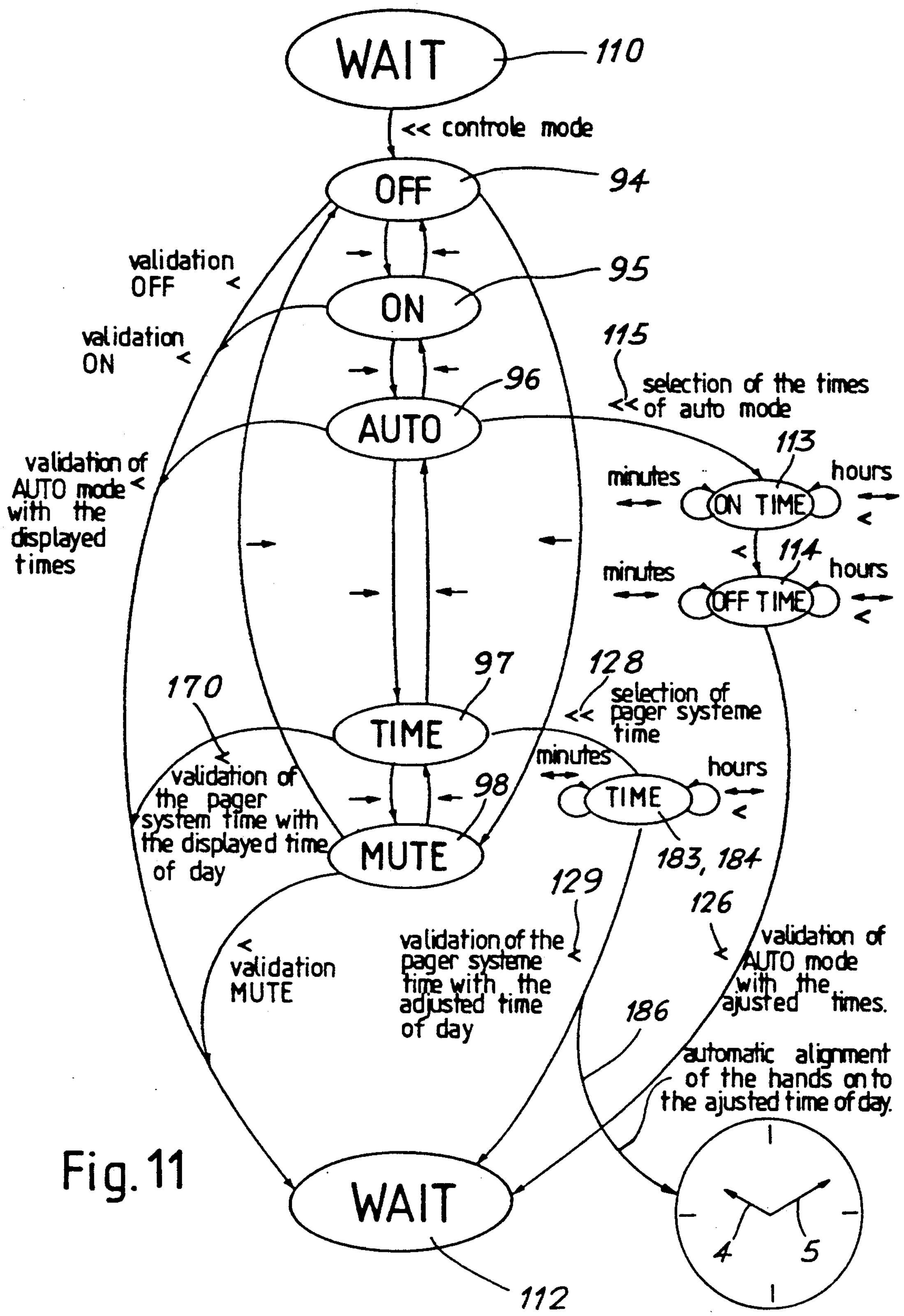
FIG. 11 is a diagram explaining the functions of the rollerball of the pager watch of FIG. 1, such diagram illustrating the states of the pager in the control mode.

FIG. 11 is a diagram explaining the functions of rollerball 1 of the watch shown on FIG. 1, such diagram illustrating the states of the pager in the control mode, such states being signalled by indicators 94 (OFF) to 98 (MUTE) illustrated on FIG. 2.

In causing the rollerball to roll in the Y direction, the pager is brought into the waiting mode 110 for which the display is neutral. From there a long pressure << is exerted on rollerball 1 which illuminates all state indicators from OFF (94) to MUTE (98) with the OFF indication blinking. The OFF state can then be validated by exerting a short pressure < on the rollerball. The pager then returns to the waiting position 112 with the OFF indicator illuminated. If the ON state is wished for, a long pressure << is exerted on rollerball 1 which illuminates all the state indicators from OFF (94) to MUTE (98) with the OFF indication blinking. Rollerball 1 is then rolled in the direction X and in the sense → until the indicator ON (95) blinks. The ON state can then be validated in exerting a short pressure < on the rollerball. The pager then returns to the waiting position 112 with the indicator ON illuminated. As shown by FIG. 11, the other states AUTO 96, TIME 97 and MUTE 98 can be obtained in the same manner, in observing that the selection of the state is obtained by rolling the rollerball in the sense → until blinking of the desired indicator and that the validation of the state which blinks is obtained by a short pressure on the rollerball. It is also observed on FIG. 11 that once having arrived at the MUTE state 98, it is possible to return to the OFF state 94 in passing by all the intermediate states by turning the rollerball in the sense ←.

FIG. 11 further shows that from the OFF state 94 the MUTE state 98 can be directly attained by rolling the rollerball in the sense ←. Inversely, from the MUTE state 98 it is possible to return directly to OFF state 94 by rolling the rollerball in the sense →.

As indicated hereinabove, following a long pressure on the rollerball, all the indicators appear and one among them is blinking. Another manner of operation could consist of having only the selected indicator blink, the other indicators being extinguished.

If the states OFF and ON are self-understood, the states MUTE, AUTO and TIME merit further explanation.

The MUTE state 98 has as purpose to put the pager into a standby state for which the received messages are at least stored in the memory RAM without having a sound signal draw the attention of the pager wearer to the fact that a message has arrived. Normally, the arrival of a message is visible on the display cell and is accompanied by an audible signal. In the MUTE state, such audible signal is suppressed. The visible signal which is that of the appearance of the message on the display cell could also be suppressed or materialized only by a serial number.

The AUTO state 96 has as purpose to turn on and turn off the pager automatically at times pre-programmed by the pager wearer. In selecting the AUTO state 96 by rolling the rollerball and in validating such state by a short pressure on such rollerball, one returns to the wait mode 112 with the hours programmed by default, that is to say, those which are found in a special memory equipping the pager. The manner of adjusting the turn-on time ON TIME 113 and the turn-off time OFF TIME 114 which appear on the diagram of FIG. 11 will now be explained likewise with the help of the manipulation program shown on FIG. 16.

Figure 12:
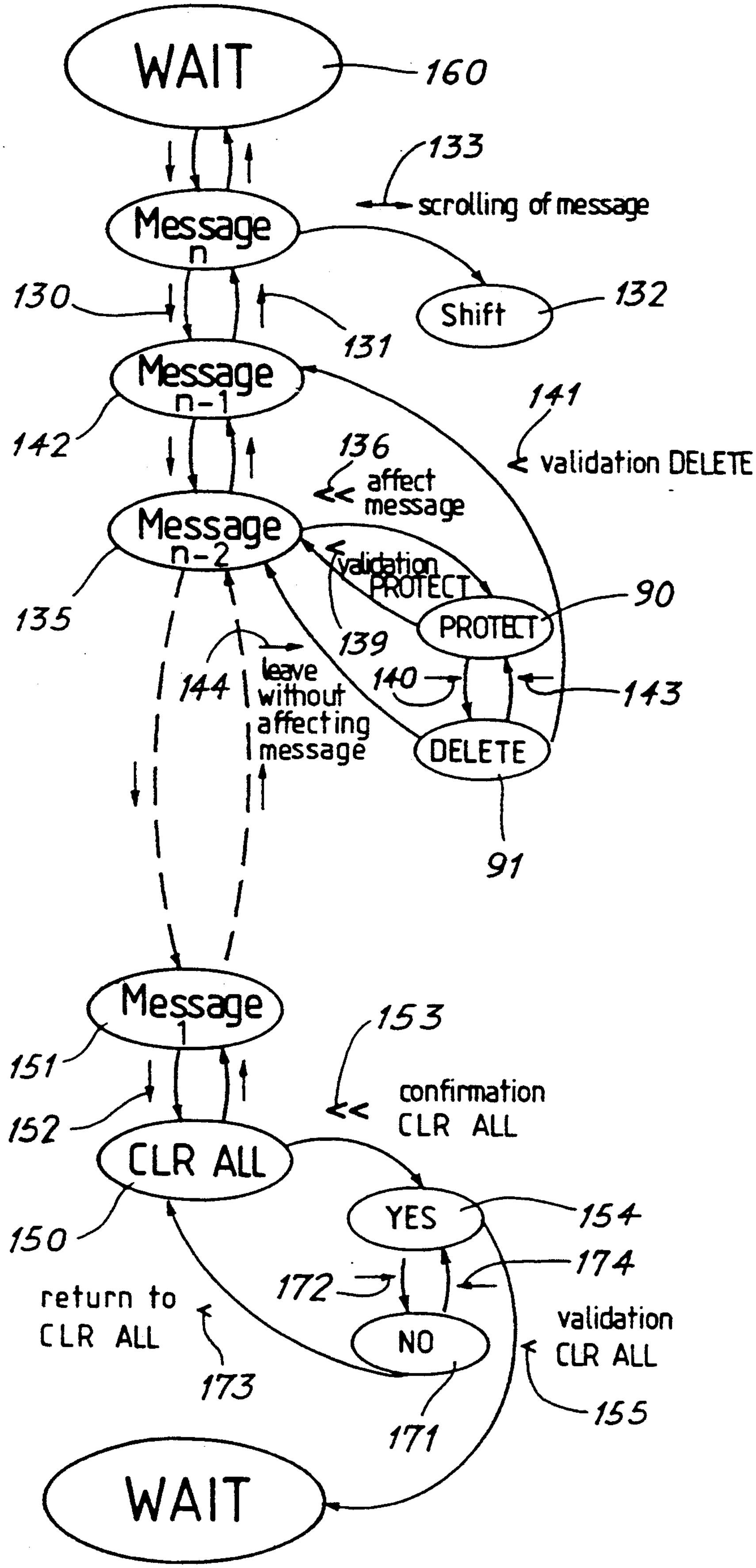
FIG. 12 is a diagram explaining the functions of the rollerball of the pager watch of FIGS. 1 and 7, such diagram illustrating the states of the pager in the message mode.

Here it is pointed out that in FIGS. 13, 14, 15 and 16 a long pressure on the rollerball has been symbolized by a long-tailed arrow which is equivalent to the symbols << of FIGS. 11 and 12. In the same manner, a short pressure on the rollerball is symbolized in FIGS. 13, 14, 15 and 16 by a short-tailed arrow which is equivalent to the symbols < of FIGS. 11 and 12.

The rollerball is manipulated to have appear on one hand the neutral display and on the other hand the AUTO indicator 96 in the validated state, in proceeding as indicated hereinabove. The indicator AUTO will be accompanied by the indicator ON if the time at which one proceeds with such adjustments is comprised in the turn-on period of the AUTO state. If not, the OFF indicator is illuminated. One then enters (see FIG. 16) the control phase or menu of the times by a long pressure 115 on the rollerball. By a rolling action 116 → on the rollerball there is selected the AUTO state 96 which blinks, the blinking state being marked by bright letters AUTO on FIG. 16. When the AUTO mode is selected, there then appears on display 117 the turn-on time (08h00) and the turn-off time (18h00). Again a long pressure 118 is exerted on the rollerball which has as result to enter into the adjustment menu of the AUTO time. The turn-on time (08h00) appears alone accompanied by the indication ON. The hours (08) blink. The hours are programmed by rolling action 119 ⟷ of the rollerball. The new hours program (07) is validated by pressure 120 on the rollerball. The validation of the hours brings about blinking of the minutes (00) of the turn-on time. One then programs the minutes by rolling action 121 ⟷ of the rollerball. The new minutes program (00) is validated by pressure 122 on the rollerball. Validation of the minutes brings about appearance of the turn-off time (18h00) with the OFF indication and blinking of the turn-off hours (18). The hours are programmed by rolling action 123 ⟷ of the rollerball. The new hours program (19) is validated by pressure 124 on the rollerball, which brings about blinking of the minutes (00) of the turn-off time. The minutes are programmed by rolling action 125 ⟷ of the rollerball. The new minutes program (00) is validated by pressure 126 on the rollerball, such validation bringing about return to the neutral display 112 with the inscription AUTO and the inscription ON if the current time of day is comprised in the turn-on period.

The state TIME 97 shown on FIG. 11 has as purpose to set the pager to the time of day for correct operation of the AUTO function. Such time setting is brought about in the following manner if reference is also had to the manipulation program of FIG. 15: the pager is arranged in the neutral display with the AUTO state illuminated. Entry is made into a control phase or menu by a long pressure 115 on the rollerball. In rolling the rollerball in the sense → the menu TIME 97 is selected, which brings about the display of the time of day (14h32). A new long pressure 128 on the rollerball causes blinking in 183 of the hours of the time of day (14), such hours being then adjustable by rolling 181 ⟷ of the rollerball, then validated by a short pressure 182 on said rollerball. Validation of the hours brings about blinking of the minutes in 184 which can be adjusted by rolling 185 ⟷ of the rollerball then validated by a short pressure 129 on said ball, such validation 129 bringing about return to the neutral display 112.

In the case in which starting off from the TIME state 97, a short pressure 170 is exerted on the rollerball instead of exerting a long pressure 128, one returns to the waiting position 112 in having validated the time already memorized in the pager.

The pager watch of the first embodiment includes only a single rollerball as control and adjustment means. It thus also concerns capability to time set the hands 4 and 5 of the timekeeper by means of such rollerball. Such problem here is resolved in employing the function TIME which is used for time setting the pager clock, as has been seen hereinabove. Effectively, the system is arranged in a manner such that when the adjusted time of day has been validated in steps 183 and 184 shown on FIG. 11, the hands 4 and 5 are automatically aligned onto said time of day. Thus, when one returns to the neutral display 112 in proceeding with the validation 129, the timekeeper is set to the time of day by the trace symbolized by 186.

It will be noted that the AUTO state is an accessory function which is not indispensable to operation of the pager watch. In a simplified version of this latter, it could be omitted. It will be further mentioned that there is provided an automatic return to the waiting mode starting out from any of the selected modes if no manipulation has been effected during thirty seconds.

It will be further noted that functions 94 to 98 are displayed in line on display 7 of FIG. 2. It is thus logical that the rollerball be rolled in the horizontal direction X ⟷ in order to choose the desired function, such rollerball being rolled in the sense ← if it is a matter of returning towards the left or in the sense → if it concerns advancing towards the right.

FIG. 12 is a diagram explaining the functions of rollerball 1 of the watch of FIG. 1, such diagram illustrating the states of the pager in the message mode.

In order to visualize the messages contained in the memory one after the other, the rollerball is caused to roll in the direction Y ↑ ↓. Rolling of the ball in the sense ↓ 130 causes disappearance of the message cell displayed (for example message n), an older message (message n-1, 142) being substituted for the vanished message. Inversely, rolling the rollerball in the sense ↑ 131 causes disappearance of the message cell displayed (for example message n-1), a more recent message (message n) being substituted for the vanished message.

As the memory is shown constituted by stacked messages, that is to say arranged in a column, it is logical to have the rollerball roll in the vertical direction Y in order to pass from one message to another.

In the case in which a message, message n for example, exceeds the capacity of the display cell, it is possible to have it run past (shift 132) sign by sign, in rolling the rollerball in the direction x ←→ 133. If the message exceeds the capacity of the display at the right (see FIG. 2), an overflow sign 99 is illuminated. In order to read the hidden signs, the rollerball is rolled in the sense ← until the sign 99 is extinguished. At such moment the overflow sign 100 is illuminated, indicating thereby that the message exceeds the display capacity at the left. There likewise it is logical that the rollerball be rolled in the direction x since a message is shown on a horizontal line.

Protection of a message is effected in the following manner. It is supposed that it is desired to protect message n-2 of FIG. 12, such message appearing under the reference 135 on FIG. 13. For this a long pressure 136 is exerted on the rollerball, which enables entering into a message treatment phase or menu in which indicators appear PROT 90 and DEL 91. The protection option PROT 90 is then selected by default. One can select then the desired option by rolling 138 ←→ the rollerball which operation in fact is not necessary since the indicator PROT is already blinking. Finally, the message protection state is validated by a short pressure 139 on the rollerball, a sign P 137 indicating such state. The indicators PROT and DEL have disappeared.

The erasure indicated by the term DELETE or DEL is effected in the following manner: it is supposed that it is desired to erase message n-2 indicated on FIG. 12, which message is referenced 135 on FIG. 14. For this, a long pressure 136 is exerted on the rollerball, which enables entering a message treatment phase or menu in which the indicator PROT 90 blinks by default, as mentioned in the preceding paragraph. The option DEL 91 is selected by rolling 140 the rollerball in the sense →. The indicator DEL 91 blinks. Finally, the erase state is validated by a short pressure 141 on the rollerball, the message 135 then disappearing from the display cell on which now appears the more recent message n-1 referenced 142. FIG. 12 also shows that starting from the blinking DELETE option, one can either return to the PROTECT option by rolling 143 of the rollerball in the sense ←, or return to message n-2 without it being affected, by rolling 144 of the rollerball in the sense →.

Figure 13:
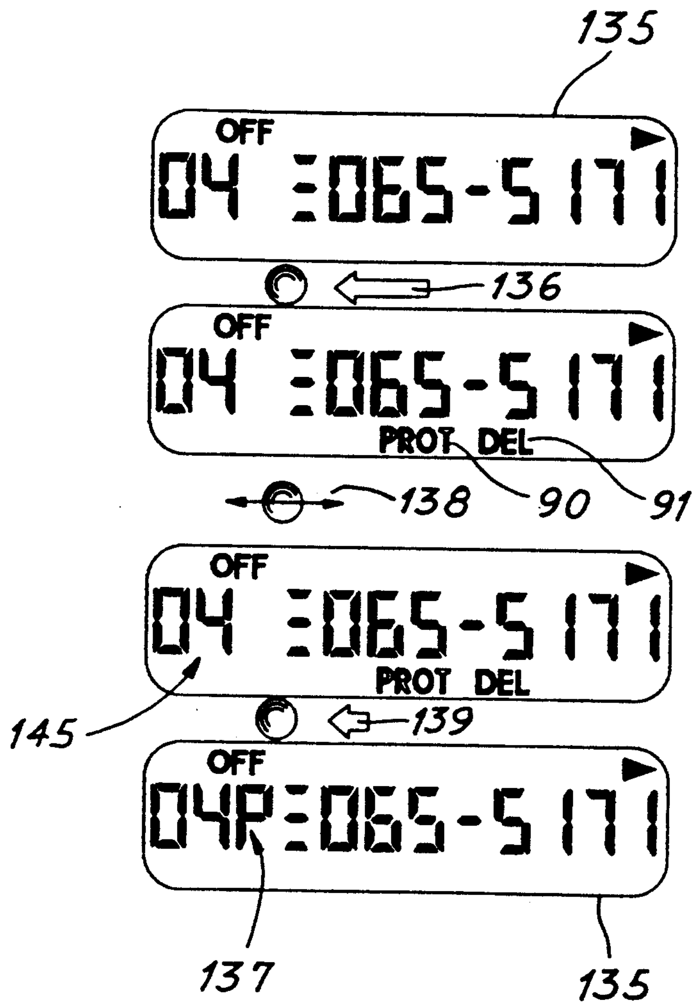
FIG. 13 shows the manipulation to be exerted on the rollerball of the pager watch of FIGS. 1 and 7 in order to protect a message contained in the memory.
Figure 14:
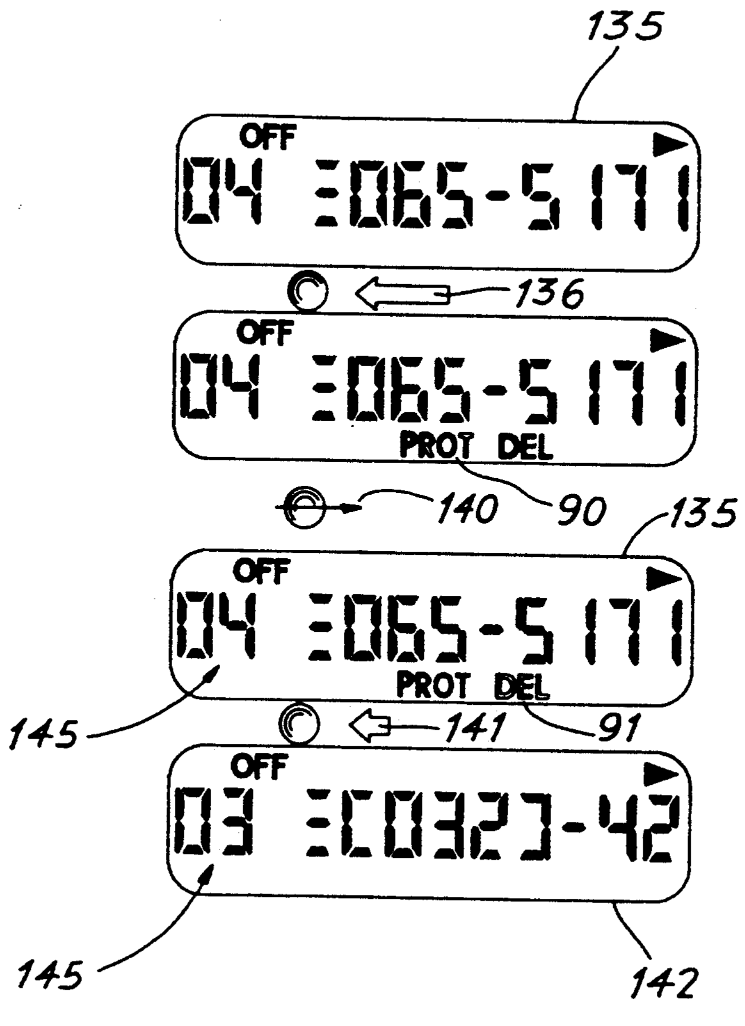
FIG. 14 shows the manipulation to be exerted on the rollerball of the pager watch of FIGS. 1 and 7 in order to erase a message contained in the memory.
Figure 15:
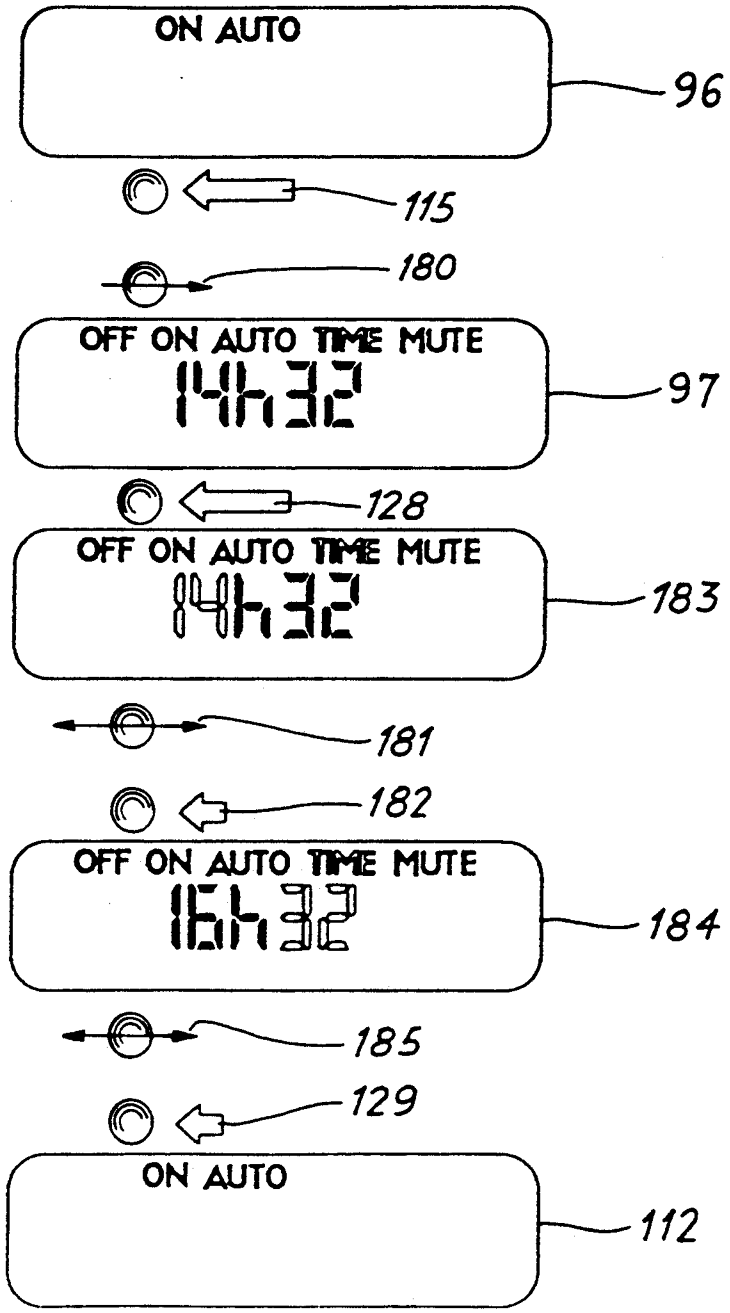
FIG. 15 shows the manipulation to be exerted on the rollerball of the pager watch of FIGS. 1 and 7 to bring about time setting of the internal clock of the pager.
Figure 16:
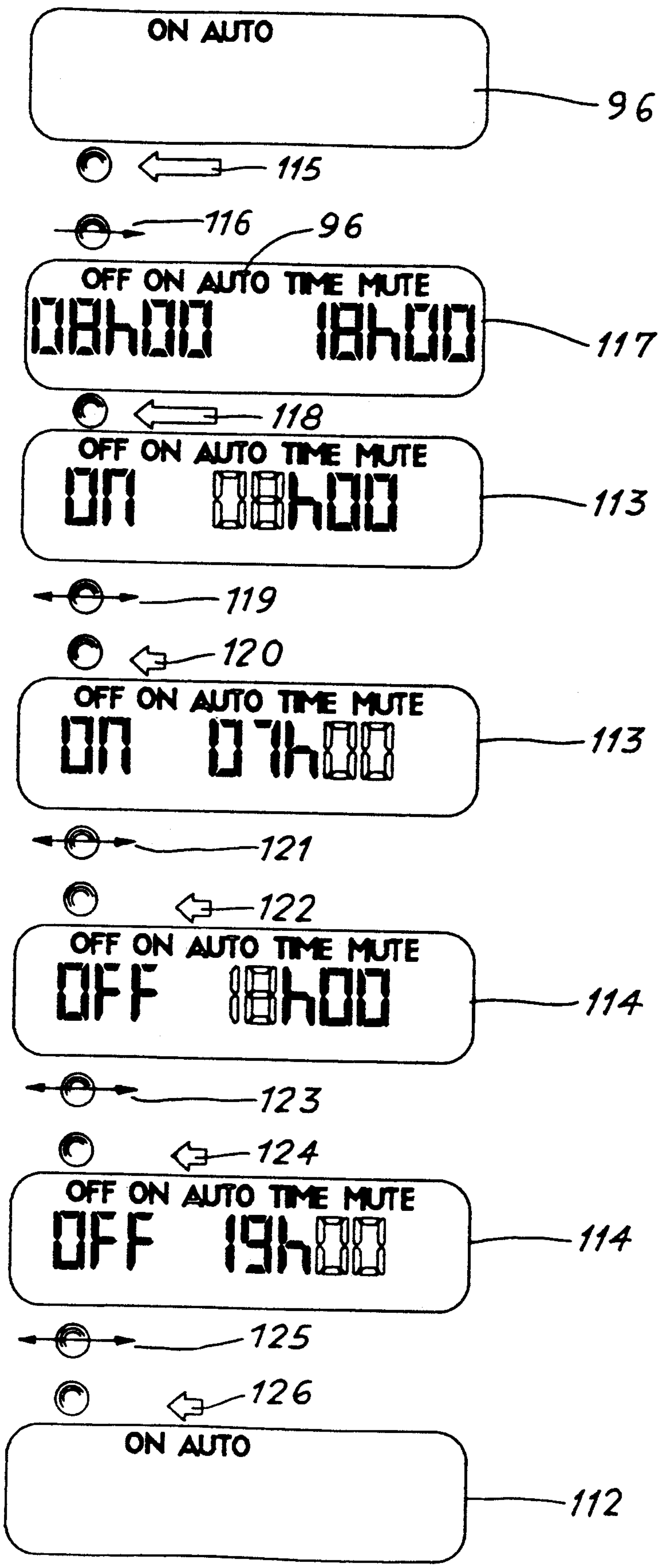
FIG. 16 shows the manipulation to be exerted on the rollerball of the pager watch of FIGS. 1 and 7 in order to set the predetermined times of turn-on and of turn-off.

As shown by FIGS. 13 and 14, the messages are preceded by a serial number 145. Here, as is seen, the protected message bears a P following the serial number.

As is further visible on FIG. 12, the pager can include arrangements for erasing on request all non-protected messages. In order to proceed with this general deletion symbolized at 150 on FIG. 12 by CLR ALL, the rollerball is driven by rolling it until the first (the oldest) received message 151 is obtained. From there further rolling ↓ 152 is exerted on the rollerball in order to obtain CLR ALL displayed by the cell, which mode is confirmed by exerting a long pressure 153 on the rollerball. At this instant appears the blinking word YES referenced by 154. If there is then exerted a short pressure 155 on the rollerball, the function CLR ALL is effected and all non-protected messages are erased at once. It will be noted that during the operation which has just been described, messages could have arrived and thus not yet have been acknowledged. The procedure described hereinabove does not erase this type of message. FIG. 12 shows further that from the function YES 154 one can cause appearance of a function NO 171 in substitution by operating the rollerball in the sense 172 →. If the function NO 171 is validated by a short pressure 173 on the rollerball, there is a return to CLR ALL without a general erasure. It will be noted that starting from the display NO 171, one can return to YES 154 in operating the rollerball in the sense 174 ←.

2. Second Embodiment

FIG. 7 is a plan view of a second embodiment of the pager watch according to the invention. Compared to the first embodiment, such second embodiment includes in addition to the control arrangement 2 by rollerball 1 a second control arrangement 3 by a crown 10. The rollerball is located preferably at 6 o'clock, but could also be placed elsewhere. Crown 10 is preferably situated at 3 o'clock. In this embodiment, the pager part of the pager watch is controlled by the rollerball 1 according to programs identical to those described with reference to the first embodiment. The timekeeper part which indicates the time of day by means of hands 4 and 5 is on the other hand controlled by the crown 10. There is thus in this second embodiment a clear separation of the timekeeping and pager functions, such separation appearing upon examination of FIG. 10 which is a block schematic of the system.

The pager portion of the FIG. 10 schematic is similar to that which has been described hereinabove with the exception of circuit 69 which includes only the microcomputer and decoder present in circuit 101 of FIG. 6. With circuit 69 is associated the rollerball control arrangement 2 which behaves as described having reference to the first embodiment. There is thus no reason to return to it here.

Figure 10:
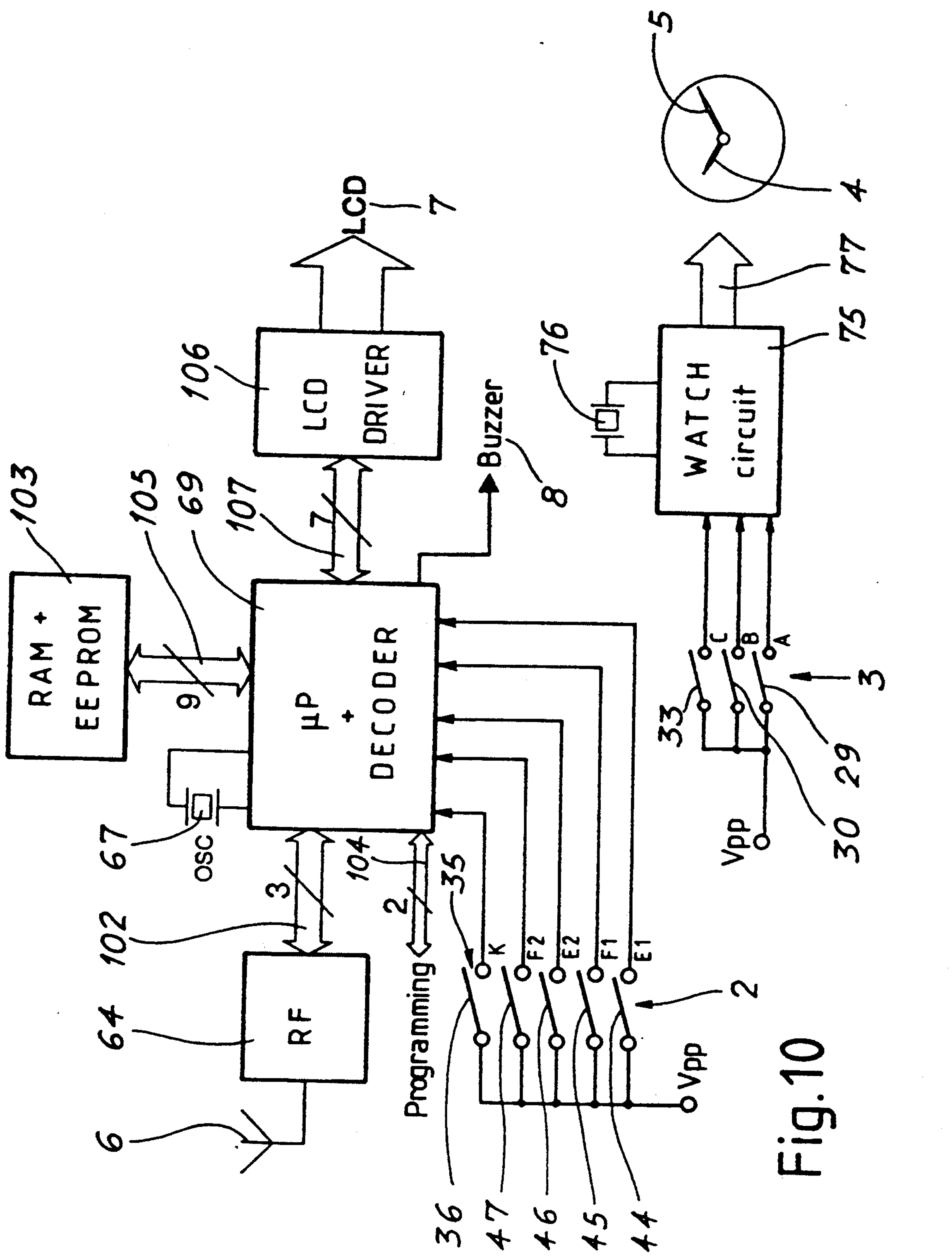
FIG. 10 is a block schematic showing the electronic part of the pager watch of FIG. 7.

The timekeeping portion of the schematic of FIG. 10 is completely separated from the pager portion and is controlled for itself alone by means of the arrangement 3 including a stem-crown which acts on a watch circuit 75 fitted with its own oscillator 76 and driving a stepping motor by line 77, such motor driving hands 4 and 5 of the watch. The watch circuit 75 can be the same as that associated with circuit 101 of FIG. 6 and described with reference to such FIG. 6.

Figure 8:
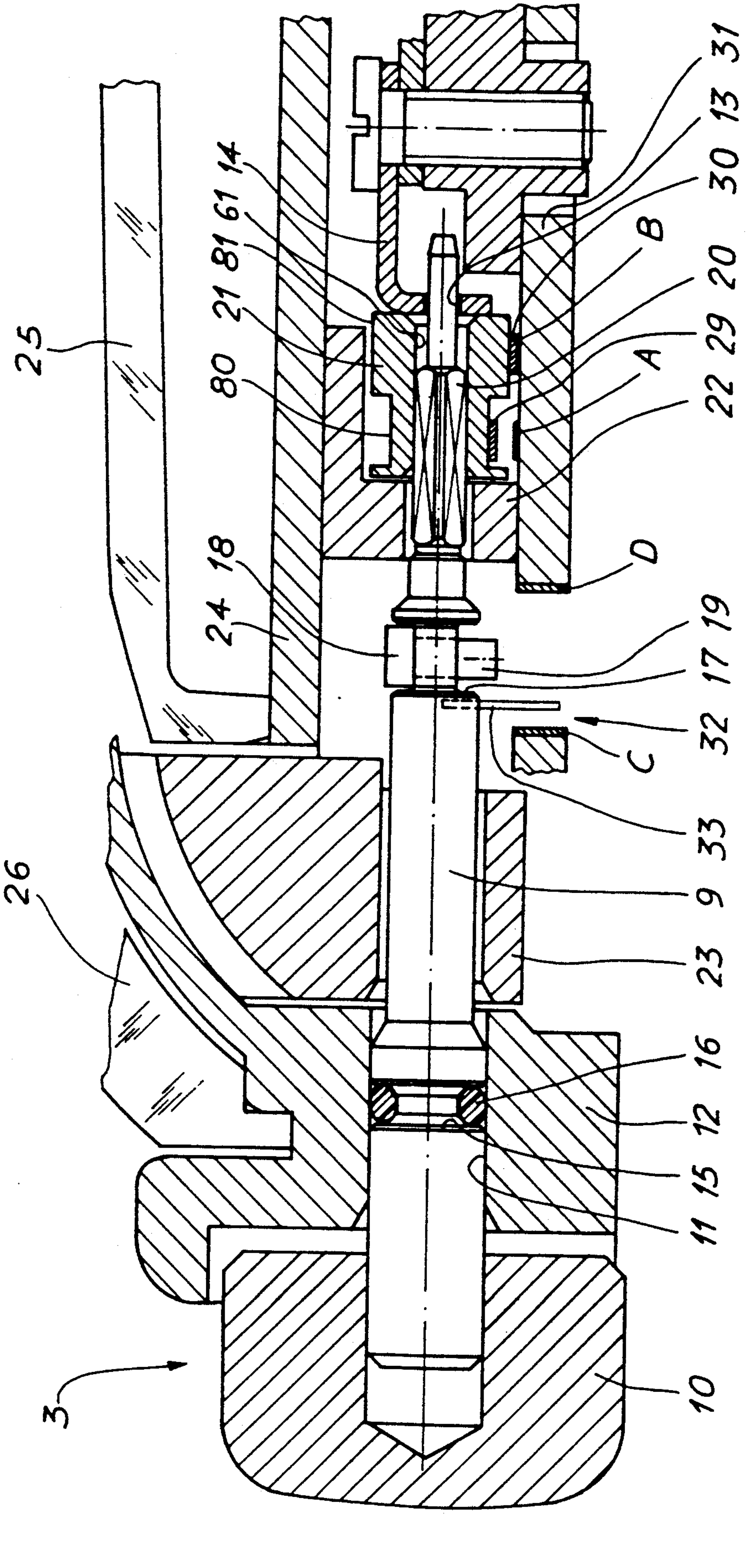
FIG. 8 is a cross-section of the mechanism of the stem - crown according to line VIII—VIII of FIG. 7.
Figure 9:
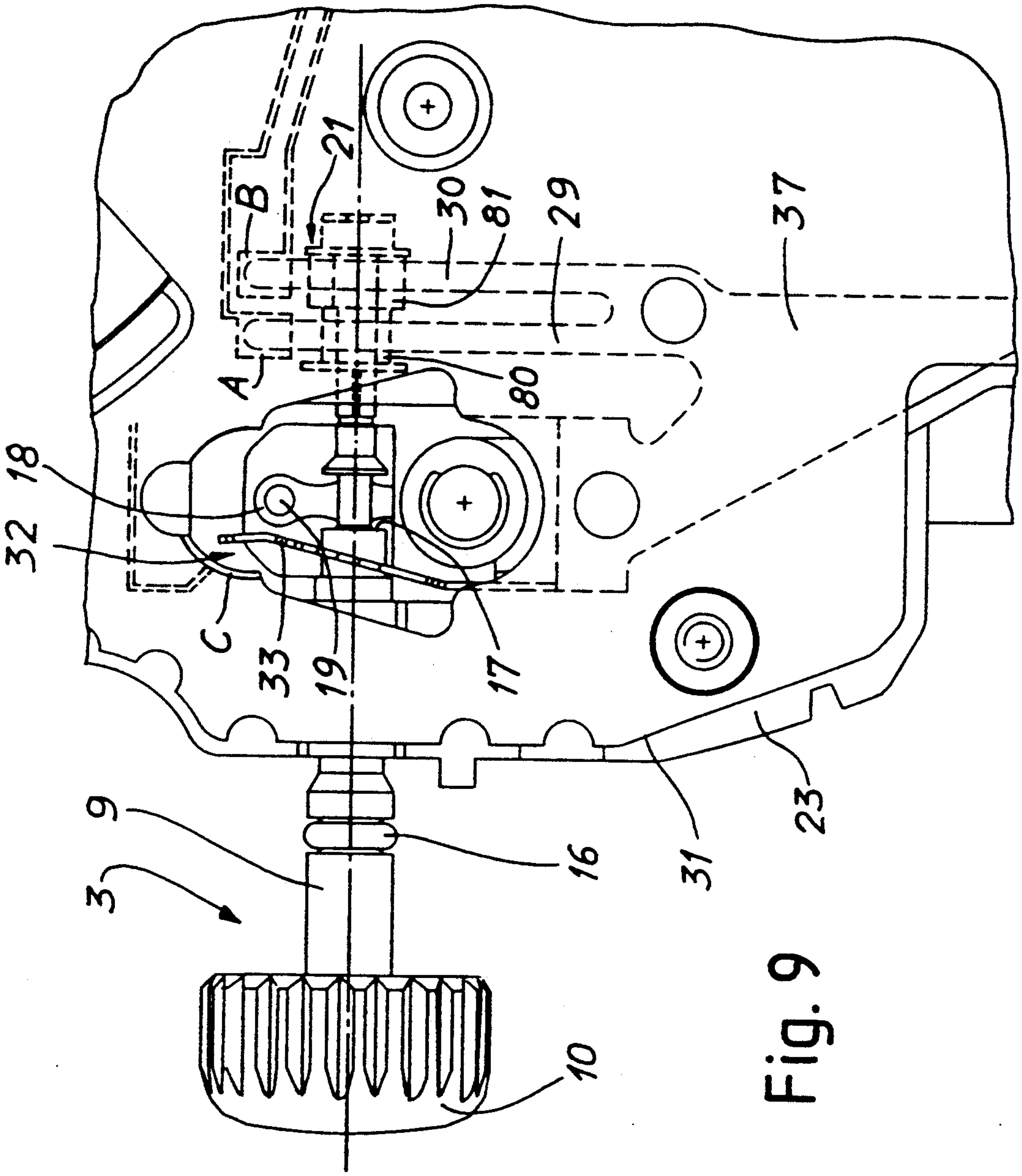
FIG. 9 is a plan view of the mechanism shown on FIG. 8.

There remains to be given some indications concerning the control arrangement 3 which is illustrated on FIGS. 8 and 9.

The stem-crown 3 of FIG. 8 includes a stem 9 on which is fitted a crown 10. On FIG. 8, the stem is shown in a neutral or pushed-in position. It can be drawn out axially. On crown 10 may be exerted a rotational movement. Stem 9 slides in an opening 11 formed in the caseband 12 of the watch case and in a hole 13 formed in an elbowed element 14. The stem includes a groove 15 in which a packing 16 is placed. The stem further includes another groove 17 in which is fitted a lever 18 fixed to a slug 19. Finally the stem comprises a squared off portion 20 adapted to slide in a sliding pinion 21 held axially in place by the elbowed element 14 and by another fixed elbowed element 22. There is further recognized on FIGS. 8 and 9 elements described in the patent document EP-A-0 460 526 already cited, namely the baseplate 23, dial 24, the first crystal 25 and the second crystal 26.

The sliding pinion 21 includes two stages 80 and 81 and a hole 61 intended to receive the squared portion 20 of stem 9. Each of the stages is formed as described with reference to the staged cam 50 of FIG. 5. As is seen on FIG. 8 and on FIG. 9 which is a plan view from below of FIG. 8, the elastic conductive blades 29 and 30 bear respectively on stages 80 and 81 of the sliding pinion 21 in a manner such that when the sliding pinion is driven in rotation by the stem, such blades 29 and 30 enter alternately into contact with respective conductive tracks designated by A and B, such tracks being engraved on a printed circuit 31. Whatever be the axial position of the stem, the sliding pinion 21 remains in place and there will always be contact of blade 29 with track A and of blade 30 with track B, such contacts taking place alternately as already mentioned.

FIGS. 8 and 9 further show that the stem mechanism includes a switch 32 formed by a conductive blade 33 adapted to come into contact with a conductive track C formed on the printed circuit 31. When the stem is drawn out, blade 33 is drawn by the slug 19 and comes into contact with tracks C thus closing switch 32. The drawn-out position is that of the time setting of the timekeeper while the pushed-in position has no effect thereon. In the drawn-out position switch 32 is closed and if the crown 10 is made to turn, the first 29 and second 30 conductive blades are alternately driven to enter into contact respectively with the first A and second B conductive tracks. Rotation of the crown at an angular velocity less than a predetermined velocity enables correction step by step in addition or in subtraction of the minutes indication according to the rotation sense of the crown, while a rotation of the crown at an angular velocity greater than said predetermined velocity enables rapid correction in addition or subtraction of the hours indication by entire time zones according to the rotation sense of the crown. The means employed for such corrections are described in detail in the patent document CH-A-643 427 (U.S. Pat. No. 4,398,831), such means being taken up in the second embodiment of the present invention. It will be added that in this first drawn-out position, correction of the time zone takes as reference the real time which runs starting from activation in the drawn-out position of the crown, means being employed in order to cancel all step by step minutes corrections which could have preceded correction of the time zone, as has been set out in the patent document EP-B-0 175 961 (U.S. Pat. No. 4,620,797).

If reference is once again had to FIG. 9, it is noted that blades 29, 30 and 33 comprise a sole and unique element having a common base 37. Such blades are cut out from a metallic sheet, then folded over at right angles as far as blade 33 is concerned. The three blades are thus found to be connected to a common electrical potential, namely $V_{pp}$ as appears in the schematic of FIG. 10.

It has been seen that in this second embodiment the pager portion is controlled by a roller ball having the same functions as those described with reference to the first embodiment with the exception of time setting of the timepiece which is brought about by means of a stem-crown. There results therefrom that the diagrams of FIGS. 11 and 12 as well as the manipulation programs of FIGS. 13 to 16 remain valid by analogy for such second embodiment. It will nevertheless be noted that on FIG. 11, the line 186 should be eliminated since the time setting of hands 4 and 5 is accomplished in another manner.

What I claim is:

1. A timepiece including a timekeeper for displaying at least the hour and the minute by means of hands, a receiver for radio broadcast messages made up of signs, a memory for storing said messages, a cell for displaying at least said messages, an acoustic transducer and a control arrangement, which at least includes a rollerball emerging partially from the caseband with which the timepiece is provided, said rollerball being adapted to be manually rolled in a first direction thanks to which at least the messages contained in the memory can be displayed one after the other, and in a second direction, substantially perpendicular to the first, thanks to which at least functions of turn-on, turn-off or entry into a special operating mode of the receiver can be chosen, said rollerball furthermore being adapted to be manually pressed against the return force of a spring in a third direction, perpendicular to the other two, thanks to which at least the displayed message can be erased or protected.

2. A timepiece as set forth in claim 1, in which the rollerball control arrangement is adapted to drive alternately first and second conductive blades which enter respectively into contact with first and second conductive tracks when the rollerball is rolled in the first direction and to drive alternately third and fourth blades which enter respectively into contact with third and fourth conductive tracks when the rollerball is rolled in the second direction and to close a switch when the rollerball is pressed in the third direction.

3. A timepiece as set forth in claim 1, wherein the messages contained in the memory are stacked over one another, the oldest at the bottom and the most recent at the top of the stack, a zone with no message, forming a neutral display when presented, surmounting the most recent message, the memory containing a limited number of messages in a manner such that if the memory is full a new entering message provokes the loss of the oldest message, if such message is not protected.

4. A timepiece as set forth in claim 3, in which if the rollerball is rolled in the first direction and if the memory contains contains several messages, said messages appear one after another on the display, from the most recent to the oldest when the rollerball is rolled in a sense running from 12 o'clock to 6 o'clock on the timepiece display and from the oldest to the most recent if the rollerball is rolled in a sense running from 6 o'clock to 12 o'clock on the timepiece display, and if the rollerball is rolled in the second direction the displayed message runs past character after character in one sense or in the other according to the sense in which the rollerball is rolled whenever the contents of the message exceed the capacity of the display cell.

5. A timepiece as set forth in claim 3, in which in order to protect or to erase a message appearing on the display cell, the rollerball is pressed in the third direction during a period greater than a predetermined period in order to enter a phase in which the protection function or the erase function can be chosen by rolling the rollerbgall int he second direction, said chosen function appearing on the display and capable then of being validated for the displayed message by exercising a further pressure on the rollerball during a period less than said predetermined period.

6. A timepiece as set forth in claim 5, furthermore including means arranged to erase on request all non-protected messages.

7. A timepiece as set forth in claim 3, in which starting from said neutral display the timepiece can be turned on, turned off or brought into a standby state in which received messages are at least stored in the memory by pressing on the rollerball in the third direction during a period greater than a predetermined period in order to enter a phase in which the turn-on function, the turn-off function or the standby function can be chosen by rolling the rollerball in the second direction, said chosen function appearing on the display and being then capable of validation, for the chosen function, by exercising a further pressure on the rollerball during a period less than said predetermined period.

8. A timepiece as set forth in claim 7, in which the display cell can additionally be brought into an operating mode for which, following pressure on the rollerball during a period greater than a predetermined period, the time of day is displayed so as to be adapted for correction by rolling the rollerball in the second direction, then validated by pressure on the rollerball during a period less than said predetermined period.

9. A timepiece as set forth in claim 8, further including means for turning it on and turning it off at times of day chosen by the user.

10. A timepiece as set forth in claim 8, in which validation of the time of day by pressure on the rollerball simultaneously brings about time setting of the hands of the timepiece.

11. A timepiece as set forth in claim 1, wherein the control arrangement further includes a stem-crown by means of which the timepiece can be set to the time of day, the rollerball control arrangement being used only for controlling the radio-broadcast message receiver.

12. A timepiece as set forth in claim 11, in which the stem-crown can be placed into at least two different axial positions, a first drawn-out position in which the timepiece can be set to the time of day by rotation of the crown and a second pushed-in position for which rotation of the crown has no effect, the first drawn-out position being arranged to close a switch and to drive alternately first and second conductive blades which respectively enter into contact with first and second conductive tracks when the crown is driven in rotation, the second pushed-in position being arranged to open said switch.

* * * * *

UNITED STATES PATENT AND TRADEMARK OFFICE

CERTIFICATE OF CORRECTION

PATENT NO. : 5,285,426

DATED : February 8, 1994

INVENTOR(S) : VIRON TEODORIDIS

It is certified that error appears in the above-identified patent and that said Letters Patent is hereby corrected as shown below:

Column 13, line 7, change "rollerbgall int he" to --rollerball in the--.

Signed and Sealed this

Fifth Day of July, 1994

Attest:

BRUCE LEHMAN

*Attesting Officer* *Commissioner of Patents and Trademarks*